(12) United States Patent
Turányi et al.

(10) Patent No.: US 10,284,485 B2
(45) Date of Patent: May 7, 2019

(54) COMMUNICATION NODES, METHODS THEREIN, COMPUTER PROGRAMS AND A COMPUTER-READABLE STORAGE MEDIUM

(71) Applicant: Telefonaktiebolaget L M Ericsson (publ), Stockholm (SE)

(72) Inventors: Zoltán Richárd Turányi, Szentendre (HU); Szilveszter Nádas, Budapest (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 492 days.

(21) Appl. No.: 14/383,939

(22) PCT Filed: Jul. 8, 2014

(86) PCT No.: PCT/SE2014/050874
§ 371 (c)(1),
(2) Date: Sep. 9, 2014

(87) PCT Pub. No.: WO2016/007053
PCT Pub. Date: Jan. 14, 2016

(65) Prior Publication Data
US 2016/0241483 A1    Aug. 18, 2016

(51) Int. Cl.
*H04L 12/867*    (2013.01)
*H04L 12/833*    (2013.01)
(Continued)

(52) U.S. Cl.
CPC ......... *H04L 47/629* (2013.01); *H04L 45/586* (2013.01); *H04L 47/2458* (2013.01); *H04L 47/2491* (2013.01); *H04L 49/9042* (2013.01)

(58) Field of Classification Search
CPC ......... H04L 47/10; H04L 47/30; H04L 47/32; H04L 47/35; H04L 47/2458; H04L 47/6291; H04L 49/9042
See application file for complete search history.

(56) References Cited

U.S. PATENT DOCUMENTS 6,085,238 A * 7/2000 Yuasa .................. H04L 12/4641
370/409
6,169,748 B1 * 1/2001 Barbas ................ H04L 12/5601
370/395.43
(Continued)

FOREIGN PATENT DOCUMENTS

| EP | 2493235 A1 | 8/2012 |
| EP | 2663037 A1 | 11/2013 |
| WO | 2013085437 A1 | 6/2013 |

OTHER PUBLICATIONS

Wang, Min et al., "Efficient QoS over LTE—a Scheduler Centric Approach", 2012 IEEE, 23rd International Symposium on Personal, Indoor and Mobile Radio Communications—(PIMRC), 1395-1400.
(Continued)

*Primary Examiner* — Phong La
(74) *Attorney, Agent, or Firm* — Murphy, Bilak & Homiller, PLLC

(57) ABSTRACT

Embodiments herein relate to a method in a first communication node (10') for transmitting a packet in a first packet network operated by a first network operator towards a destination node (10",12). The first communication node (10') is comprised in the first packet network. The first communication node (10') receives a packet with a first value related to resource sharing in a second packet network operated by a second network operator, wherein the first value indicates a level of importance of the packet relative importance of another packet along a scale of the second packet network. The first communication node (10') remarks
(Continued)

the packet with a second value related to resource sharing in the first packet network, wherein the second value indicates a level of importance of the packet relative importance of another packet along a scale of the first packet network. The first communication node (10') transmits, over the first packet network, the remarked packet towards the destination node (10",12).

22 Claims, 7 Drawing Sheets

(51) Int. Cl.
*H04L 12/713* (2013.01)
*H04L 12/857* (2013.01)
*H04L 12/861* (2013.01)

(56) References Cited

U.S. PATENT DOCUMENTS

| | | | | |
|---|---|---|---|---|
| 6,798,743 | B1* | 9/2004 | Ma | H04L 12/5693 370/235 |
| 7,277,388 | B1* | 10/2007 | Koodli | H04L 47/32 370/230.1 |
| 7,983,299 | B1* | 7/2011 | Ma | H04L 47/52 370/229 |
| 2003/0133411 | A1* | 7/2003 | Ise | H04L 12/5695 370/230 |
| 2005/0271048 | A1* | 12/2005 | Casey | H04L 12/5695 370/389 |
| 2006/0002370 | A1* | 1/2006 | Rabie | H04L 12/4645 370/351 |
| 2006/0187942 | A1* | 8/2006 | Mizutani | H04L 47/2408 370/401 |
| 2007/0153682 | A1* | 7/2007 | Swenson | H04L 47/10 370/229 |
| 2007/0171928 | A1* | 7/2007 | Kim | H04L 47/10 370/412 |
| 2007/0280105 | A1* | 12/2007 | Barkay | H04L 47/10 370/229 |
| 2007/0297348 | A1* | 12/2007 | Trac | H04L 47/10 370/254 |
| 2008/0008202 | A1* | 1/2008 | Terrell | H04L 12/5693 370/401 |
| 2008/0019371 | A1* | 1/2008 | Anschutz | H04L 47/10 370/394 |
| 2008/0062891 | A1* | 3/2008 | Van der Merwe | H04L 45/04 370/254 |
| 2008/0159135 | A1* | 7/2008 | Caram | H04L 12/5693 370/230 |
| 2009/0193144 | A1* | 7/2009 | Zeitak | H04L 47/10 709/240 |
| 2009/0219937 | A1* | 9/2009 | Liu | H04L 45/302 370/392 |
| 2009/0285091 | A1* | 11/2009 | Hiscock | H04L 12/24 370/230 |
| 2011/0276699 | A1* | 11/2011 | Pedersen | H04L 45/24 709/227 |
| 2012/0003959 | A1* | 1/2012 | Gonzalez-Canedo | H04W 72/10 455/411 |
| 2012/0140633 | A1* | 6/2012 | Stanwood | H04L 47/2458 370/235 |
| 2014/0226663 | A1* | 8/2014 | Chan | H04L 45/741 370/392 |
| 2014/0307554 | A1* | 10/2014 | Basso | H04L 47/2441 370/235 |
| 2014/0307555 | A1* | 10/2014 | DeCusatis | H04L 47/39 370/236 |
| 2016/0029403 | A1* | 1/2016 | Roy | H04W 72/0406 370/336 |

OTHER PUBLICATIONS

Nádas, Szilveszter et al., "Transmitting Node, Receiving Node, and Methods Therein", Telefonaktiebolaget L M Ericsson (publ), Unpublished PCT Application No. PCT/SE2013/050592, filed May 23, 2013, 1-41.
Braden, R. et al., "Resource ReSerVation Protocol (RSVP)—Version 1 Functional Specification", Network Working Group, Request for Comments 2205, Standards Track, Sep. 1997, 1-112.
Cao, Zhiruo et al., "Rainbow fair queueing: theory and applications", Elsevier, Computer Networks 47, 2005, 367-392.
Heinanen, J. et al., "Assured Forwarding PHB Group", Network Working Group, Request for Comments 2597, Category: Standards Track, Jun. 1999, 1-11.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.4.0, Mar. 2014, 1-302.
3GPP, "3rd Generation Partnership Project; Technical Specification Group Services and System Aspects; General Packet Radio Service (GPRS); Service description; Stage 2 (Release 12)", 3GPP TS 23.060 V12.4.0, Mar. 2014, 1-345.

* cited by examiner

COMMUNICATION NODES, METHODS THEREIN, COMPUTER PROGRAMS AND A COMPUTER-READABLE STORAGE MEDIUM

TECHNICAL FIELD

Embodiments herein relate to a first communication node, a second communication node, methods therein, computer programs, and a computer-readable storage medium. In particular, embodiments herein relate to transmit, from a second packet network operated by a second network operator, a packet in a first packet network operated by a first network operator towards a destination node.

BACKGROUND

In a typical communications network such as a radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

There are two common ways of defining and signaling desired resource demands to a bottleneck in a communications network in for example a core network such as a packet network. A bottleneck being a location in the communications network where a single or limited number of components or resources affects capacity or performance of the communication network.

A first common way is to pre-signal/pre-configure the desired resource sharing rules for a given traffic aggregate, such as a flow or a bearer, to a bottleneck node prior the arrival of the actual traffic. The bottleneck node then implements the handling of the traffic aggregates based on these sharing rules, e.g. uses scheduling to realize the desired resource sharing. Examples for this pre-signaling/pre-configuration method are e.g. the bearer concept of 3GPP [3GPP TS 23.401 v12.4.0], SIRIG [3GPP TS 23.060 section 5.3.5.3, v12.4.0], or Resource Reservation Protocol (RSVP) [RFC2205]. An example scheduling algorithm for this method, implementing the 3GPP bearer concept at an LTE eNB, may be found in Wang Min, Jonas Pettersson, Ylva Timner, Stefan Wanstedt and Magnus Hurd, Efficient QoS over LTE—a Scheduler Centric Approach. Personal Indoor and Mobile Radio Communications (PIMRC), 2012 IEEE 23rd International Symposium. Another example of this is to base the resource sharing on Service Value as described in Service Value Oriented Radio Resource Allocation, WO2013085437.

A second common way is to mark packets with priority—this would give more resources to higher prio flows, or with drop precedence, which marks the relative importance of the packets compared to each other. Packets of higher drop precedence are to be dropped before packets of lower drop precedence. An example for such method is DiffSery Assured Forwarding (AF) within a given class [RFC2597]. Also such a method with several drop precedence levels are defined in a Per-Bearer Multi Level Profiling, EP2663037.

It is an open issue how to signal service policies to different bottlenecks of resources, including both transport bottlenecks and radio links. The term 'service policy' or policy in this document denotes instructions on how the available resources at a packet scheduler shall distribute the available, primarily transmission, resources among the packets of various packet flows arriving to the scheduler. The term 'resource sharing policies' is used in the same meaning. In the case of radio links, the service policy also needs to define how a terminal dependent radio channel overhead should affect the resource sharing. Such a scheme for signaling is preferably simple, versatile and fast adapts to the actual congestion situation.

Resource sharing may also be implemented in a virtual networking setting. Virtual networking used herein means as follows:

A Physical Network Operator (PNO) owns and operates a physical network infrastructure including nodes such as switches, routers or any other packet/frame/cell switching devices, and links.

The PNO slices its network resources and/or nodes among multiple Virtual Network Operators (VNO). The VNOs operate their own network, which, potentially only in part, may be implemented over one slice of the PNO's network. The PNO physical owns a network and several other operators, VNOs, buy a contract from PNO to use his physical network. Based on this the PNO lets the VNOs use his network based on the contract. A VNO might be using only a part of the PNO's network.

And resource sharing in virtual networking relates to how to share PNO's resources among the VNOs.

Note that it may be that a VNO owns some physical infrastructure as well and combines it with the virtual resources it receives from the PNO into a unified network. In this case resource sharing among the VNOs is handled only in the part obtained from the PNO.

Examples of virtual networking implemented today include

Ethernet Virtual Local Area Networks (VLAN) enabling to run multiple Local Area Networks (LAN) over a single physical infrastructure.

L2 or L3 Virtual Private Networks (VPN) enabling several clients to use network resources of a transport provider.

Today's cloud networking uses virtual networking to a very large extent—often several layers, not just two as in the explanation above.

A final, but equally interesting case is that of a mobile operators' roaming scenario. In this case, the home and visited operators are in a situation very similar to the VNO and PNO, respectively. The home operator uses the visited operator's resources to provide services to a customer of the home operator and both of the operators have resource sharing policies.

Any technique to control routing and forwarding falls into scope of resource sharing in virtual networking. For example, The PNO may provide full VPN services to the VNOs. In this case path selection within the slice is entirely controlled by the PNO—the VNO essentially sees it as a big link or node.

The PNO may slice a forwarding table memory of the physical switches among the VNOs and provide access to each slice to its correspondent VNO. In this case VNOs may govern how forwarding happens within their slice of the forwarding table memory.

There are a few existing solutions to resource sharing in virtual networking.

One method, which is typically used, is to allocate guaranteed resources to VNOs. For example a first VNO and a second VNO may have 10 Gbit/s and 20 Gbits/s allocated, respectively on every link of the PNO. The PNO applies per/VNO queues to provide the aforementioned amount and to protect one VNO from the other.

Another method is not to apply any special queuing inside the PNO, but to limit VNOs at the edge and thereby provide protection against one VNO taking too much resources.

A third method also typically used is to assign the VNOs' traffic into traffic classes based on their Quality of Service (QoS) requirements and do edge policing on a per class/per VNO basis. Inside the PNO network the traffic classes are handled by e.g., priority queuing and no distinction is made among the VNOs.

The above may be combined with policing and shaping inside the network nodes on a per VNO basis.

Existing solutions may be grouped into classes

A first class solves the resource sharing problem by assigning guaranteed resources to VNOs. This means that resources not used by a VNO cannot be utilized by another VNO. This is not good business for the PNO, because any statistical multiplexing gains are lost. While this type of resource sharing is good when absolute guarantees are a must, such as for real-time traffic, this type wastes resources for less demanding, more elastic or adaptive traffic.

A second class of solutions maintains per VNO queues, or one queue per VNO and service class. This class is able to achieve fine grained resource sharing among VNOs by applying various queuing disciplines, shapers and policers. The drawback of this class is its limited scalability and flexibility. Networking gear usually has a limited amount of queues limiting the number of VNOs. Changing the resource sharing policy may require changes to the queuing policy. For example to provide a combination of priority and proportional weighted sharing requires a queuing mechanism supporting such sharing, which is not typically available.

A third class does not differentiate between traffic of different VNOs inside the network of the PNO, but only at the edges. This results in (largely) equal resource sharing with fully taking advantage of statistical multiplexing. Differentiation between VNOs, applying the policy of the PNO, is attempted by shaping/policing at the edges. This obviously has serious limitations, as any PNO policy on resource sharing may only be applied at the edge and since traffic conditions may be very different at an internal bottleneck the policy may not get realized there due to the fact that the bottleneck makes no differentiation. This class may be improved by introducing traffic classes and performing some performing edge policing and internal node queuing based on them. This allows rudimentary differentiation within the traffic of one VNO in addition to enhancing the differentiation between VNOs, by classifying more or less of their traffic as e.g., "high priority". However, the traffic classes implemented inside the PNO network actually limits what kind of differentiation policy the VNOs can have among their clients.

Sometimes a combination of the above solutions is used, such as providing a guaranteed rate ($1^{st}$ class) and filling the unused capacity with "best effort" traffic ($3^{rd}$ class). This is an improvement, but the combination only provides limited control over how the capacity used by the best effort part, admittedly the bulk of the capacity, is distributed among second packet networks such as VNOs. This results in a solution that is not flexible and uses the resources of a first packet network e.g. the network of the PNO, in a non-efficient manner.

SUMMARY

An object of embodiments herein is to provide a mechanism that distributes resources in a communications network in an efficient manner.

According to an aspect the object is achieved by a method in a first communication node for transmitting a packet in a first packet network operated by a first network operator towards a destination node. The first communication node is comprised in the first packet network. The first communication node receives a packet with a first value related to resource sharing in a second packet network operated by a second network operator, wherein the first value indicates a level of importance of the packet relative importance of another packet along a scale of the second packet network. The first communication node remarks the packet with a second value related to resource sharing in the first packet network, wherein the second value indicates a level of importance of the packet relative importance of another packet along a scale of the first packet network. The first communication node transmits, over the first packet network, the remarked packet towards the destination node.

According to another aspect the object is achieved by a method in a second communication node for transmitting, from a first packet network operated by a first network operator, a packet towards a destination node in a second packet network operated by a second network operator. The second communication node is comprised in the first packet network. The second communication node receives a packet with a second value related to resource sharing in the first packet network, wherein the second value indicates a level of importance of the packet relative importance of another packet along a scale of the first packet network. The second communication node retrieves a first value in the received packet, which first value is related to resource sharing in the second packet network, and which first value indicates a level of importance of the packet relative importance of another packet along a scale of the second packet network. The second communication node then transmits the packet with the first value towards the destination node in the second packet network.

According to yet another aspect the object is achieved by providing a first communication node for transmitting a packet in a first packet network operated by a first network operator towards a destination node. The first communication node is configured for the first packet network, and further being configured to receive a packet with a first value related to resource sharing in a second packet network operated by a second network operator. The first value indicates a level of importance of the packet relative importance of another packet along a scale of the second packet network. The first communication device remarks the packet with a second value related to resource sharing in the first packet network, wherein the second value indicates a level of importance of the packet relative importance of another packet along a scale of the first packet network. The first communication device is then configured to transmit, over the first packet network, the remarked packet towards the destination node.

According to still another aspect the object is achieved by providing a second communication node for transmitting, from a first packet network operated by a first network operator, a packet towards a destination node in a second packet network operated by a second network operator. The second communication node is configured for the first packet network, and further being configured to receive the packet with a second value related to resource sharing in the first packet network, wherein the second value indicates a level of importance of the packet relative importance of another packet along a scale of the first packet network. The second communication node is also configured to retrieve a first value in the received packet, which first value is related to resource sharing in the second packet network. The first value indicates a level of importance of the packet relative importance of another packet along a scale of the second packet network. The second communication node is furthermore configured to transmit the packet with the first value towards the destination node in the second packet network.

According to yet still another aspect the object is achieved by providing computer programs comprising instructions, which, when executed on at least one processor, cause the at least one processor to carry out the methods according to the methods herein, as performed by the first communication node or the second communication node.

According to yet still another aspect the object is achieved by providing a computer-readable storage medium comprising a computer program, which computer program comprises instructions which, when executed on at least one processor, cause the at least one processor to carry out the methods herein, as performed by the first or second communication node.

By using the first value in the first packet network and the second value in the second packet network, the resources of the different networks may be efficiently distributed.

BRIEF DESCRIPTION OF DRAWINGS

Embodiments will now be described in more detail in relation to the enclosed drawings, in which.

DETAILED DESCRIPTION

Figure 1:
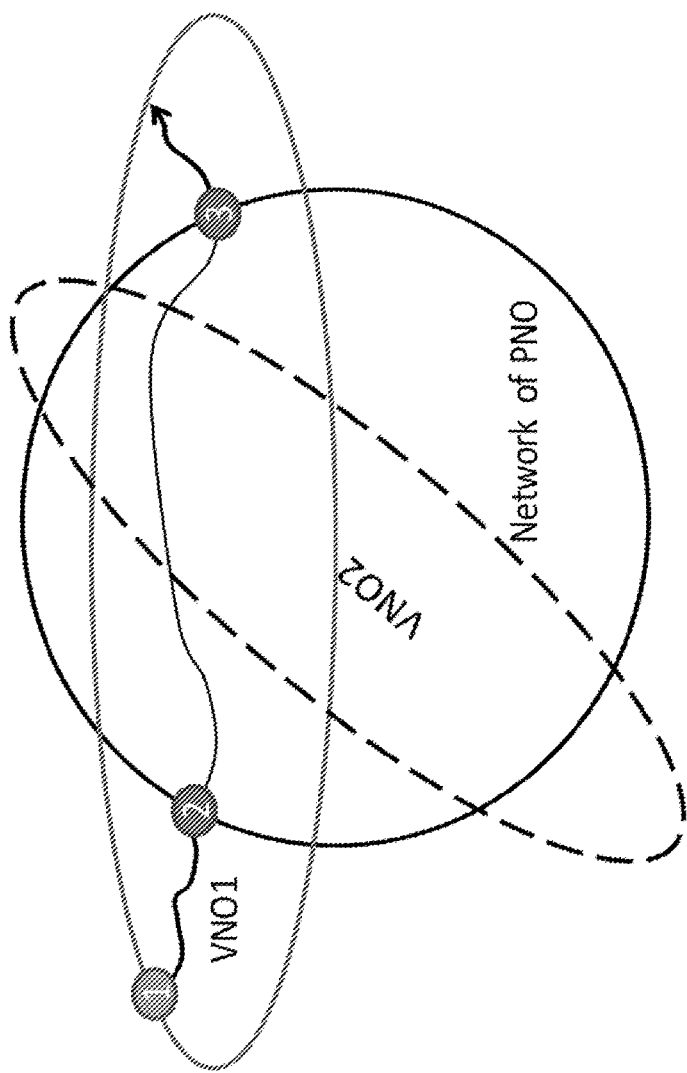
FIG. 1 is a schematic overview depicting a PNO-VNO scenario according to embodiments herein.

FIG. 1 illustrates one possible arrangement for a PNO-VNO setup, e.g. wherein PNO is a first network operator operating a first packet network and a VNO is a second network operator operating a second packet network. A circular middle network represents the physical infrastructure of the PNO. An horizontal ellipse, VNO1 and a diagonal ellipse, VNO2, represent domains or networks of the VNOs, wherein the part outside the PNOs network may be physical infrastructure; and the part inside the PNOs network may be virtual, implemented by the PNOs devices. Embodiments herein build on packet value concept such as a Per-Packet Operator Value (PPOV) concept, wherein a value of a packet indicates a level of importance of the packet relative importance of another packet along a linear scale in the packet network, but may also be represented by a value logarithmically encoded. But may also be viewed as an extension of the Rainbow Fair Queueing model (see e.g. Rainbow fair queueing: theory and applications, Computer Networks 47 (2005) pages 367-392), since that is similar to PPOV. Embodiments herein disclose an extension of e.g. the PPOV concept, to provide e.g. the virtual networking as described in the background section in an efficient manner. Specifically, embodiments herein enable the fulfilling of resource sharing policies of both the virtual network operator and the physical network operator.

For example, in the VNO1 network a path of a packet is depicted. According to embodiments herein, a packet is to be re-marked, since the packet arrives already marked in the VNO1 network, being an example of the second packet network, to the edge of the PNO network, being an example of the first packet network, at point #2. At point #1, the packet is assigned an original value or first value depending on the policies of VNO1. This first value is used when the packet traverses the path segment up to point #2, e.g. according to a PPOV process. At point #2 the PNO re-marks the packet according to its own policies. An example of the re-marking process is described in embodiments herein. In the exemplified scenario depicted in this FIG. 1 the PNO encapsulates the packet, addressing it towards its egress edge node at point #3, being an example of the destination node, and assigns a newly calculated value, a second value, to its outer header. The packet is forwarded to point #3 using the assigned second value, where it gets decapsulated and the first value appears and is used on the remainder of the packet path in the VNO network.

Any packet networking technique is in scope herein, such as Layer 2 (L2), Layer 3 (L3), Multiprotocol Label Switching (MPLS), Ethernet, Internet Protocol (IP) or tunneled versions. The only requirement is that the data plane technology should support virtualization, using some form of encapsulation or tagging, and the ability to carry PPOV values.

The specific problems solved by some embodiments herein are: 1) how the PNO may govern resource sharing between the VNOs according to their policy in a scalable manner with fully reaping the benefits of statistical multiplexing; 2) how may the VNOs govern resource sharing among their flows according to their policy in a scalable manner fully exploiting statistical multiplexing also inside the virtualized part of their network; and 3) how the above two policies may simultaneously be taken into account.

Some embodiments herein actually offer several levels of virtualization, that is, the case when a VNO further splits its resources among multiple "Virtual VNOs" (VVNO) of its own. In this case resource sharing in the PNO must consider three policies: 1) that of the PNO governing how physical resources shall be distributed among VNOs; 2) that of the VNO on how the resources it got from the PNO shall be distributed among its VVNOs; and 3) that of the VVNO on how the resources it got from the VNO shall be distributed among its clients. By 'resources' mentioned herein it is primary meant 'bandwidth' herein.

Each VNO uses a packet value concept such as the PPOV concept to provide policy-based resource sharing among the flows of its clients. That is, packets enter the VNO's network with first values assigned to them. The PNO has e.g. a PPOV curve for each of its VNOs representing the resource sharing policy of the PNO. Such curves can express, e.g., proportional weighted sharing, priority or a combination.

When the packets of the VNO arrive to the edge node of the PNO, which may be the same as the edge node of the VNO if the VNO has no physical infrastructure of its own, the PNO encapsulates or tags the packet; saves the first value in the tag or inner header; and may re-compute a second value based on the PPOV curve assigned to the VNO by the PNO. Then the packet is transmitted through the PNO observing the second value. At egress node the packet is de-capsulated or the tag is removed and the packet continues to travel using its original value i.e. the first value.

The second values assigned to incoming packets are computed such that following criteria may be complied with 1) they fully conform to the PPOV curve of the VNO and 2) a value ordering of arriving packets is preserved as much as possible, a packet with a higher incoming first value will have a higher second value, as well. The first criterion ensures that resource sharing among VNOs follow the policy of the PNO. The second criterion ensures that resource sharing policies of the VNO will be preserved during the transit through the PNO's network.

Figure 2:
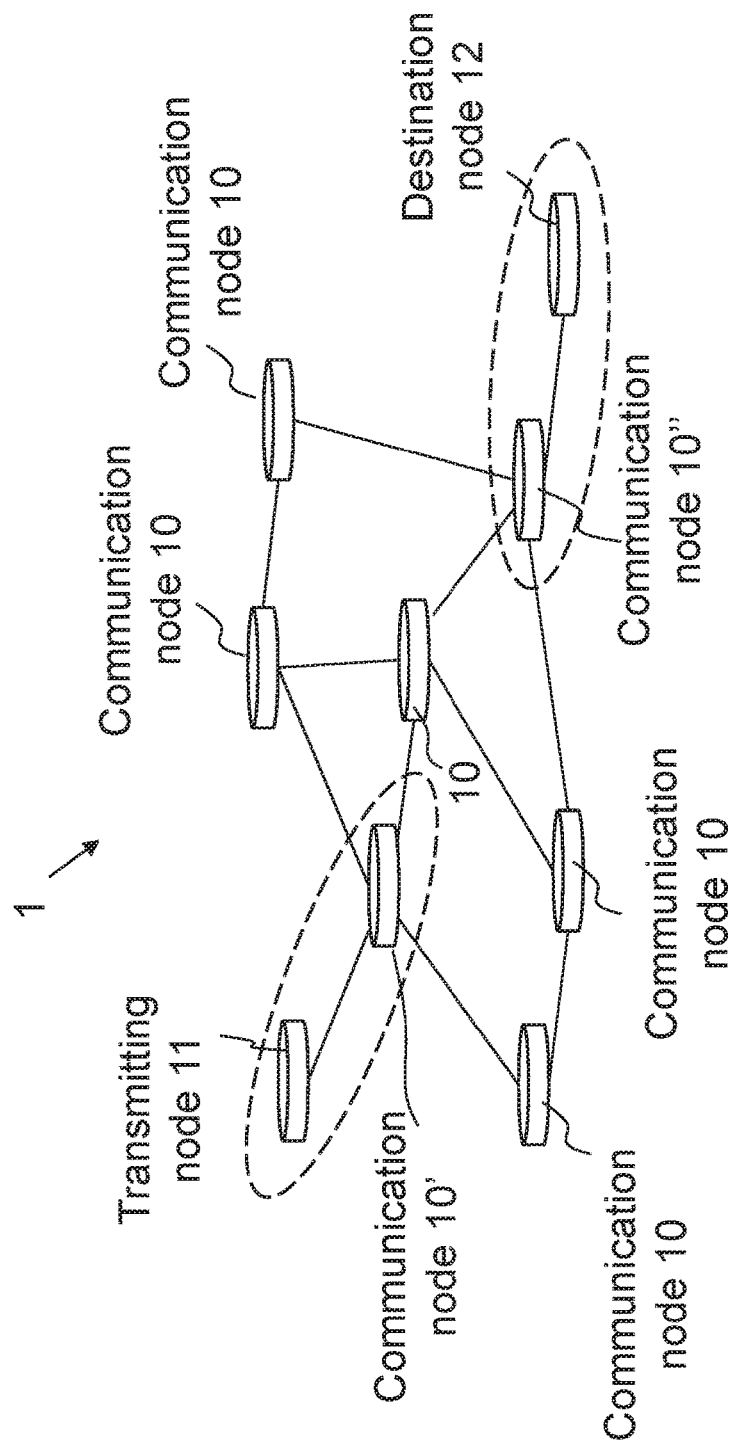
FIG. 2 is a schematic overview depicting a communications network according to embodiments herein.

FIG. 2 is a schematic overview depicting a communications network 1 according to embodiments herein. A first network operator exemplified herein as a physical network operator controls a plurality of communication nodes 10 of a first packet network, exemplified herein as a physical network, and a second network operator exemplified herein as a VNO controls a transmitting node 11 or original node, and a receiving node or a destination node 12 of a second packet network exemplified herein as a virtual network. Packets are transported over the communications network 1 from the transmitting node 11 to the destination node 12. It should here be noted that the transmitting node 11 may be integrated with a first communication node 10' as indicated by the dashed ellipse and similarly, the destination node 12 may be integrated with a second communication node 10". The first and second communication nodes may also be denoted as first and second edge nodes.

The communication nodes 10,10',10", the transmitting node 11, and the destination node 12 may e.g. be a router, a switch, or any node with a scheduler or a packet handler transporting one or more packets within the communications network 1. According to the PPOV concept a communication node, such as the first communications node 10', associates the packet with a value related to resource sharing.

According to embodiments herein a method in the first communication node 10' is provided for transmitting a packet in the physical network operated by the PNO, towards the destination node 12. The first communication node 10' receives the packet with the first value related to resource sharing the virtual network operated by the VNO. The first value indicates a level of importance of the packet relative importance of another packet along a, e.g. linear, scale in the virtual network such as a PPOV. The first communication node 10' remarks or marks the packet with a second value related to resource sharing in the physical network, wherein the second value indicates a level of importance of the packet relative importance of another packet along a, e.g. linear, scale in the physical network. The first communication node 10' transmits, over the physical network, the remarked packet towards the destination node 12.

Embodiments herein relate to the (re-)marking of packets before transmission over the physical network of the physical network operator. Thus, embodiments herein relate to the first communication node 10' remarking, and thereby encapsulating the first value or virtual value for the virtual network of the VNO, the packet with the second value of the PNO. 1. The first communication node 10' thus just sees the first values of the incoming traffic and re-marks based on those and its own policy towards this VNO.

The packets are marked at the transmitting node 11 according to a policy of the VNO, such as using PPOV or RFQ concept; and thus the packets arrive already marked to the edge node of the physical network, e.g. at the first communication node 10'. As stated above, these two edge nodes or nodes may be co-located but managed separately by the VNO and PNO. The packet or packets are re-marked to consider a policy of the PNO. The characteristics of such re-marking may be that A) the resulting packet stream complies with, fit into the envelope of, a PPOV curve the PNO has assigned to this virtual network; and that B) two packets arriving with values A and B where A<B, shall be remarked with A' and B', respectively such that A'<B'. In short, the value ordering shall be preserved as much as possible. That is a value ordering of arriving packets from the VNO is preserved as much as possible, i.e. a packet with a higher incoming first value than a second packet, will have a higher second value than the second packet in the physical network as well. The first and second values reflect the importance of the packet for the respective operator in a scale wherein the first/second value corresponds to a level of importance along the scale of that network. The first/second value indicates a level of importance of the packet relative importance of another packet. For example, the first/second value '1000' indicates that the packet is 100 times as important as a packet with the first/second value '10' and 10 times as important as a packet with first/second value '100'. The importance may be determined based on the actual contents of the packet payload, e.g. important video frame, or based on the specific packet flow, e.g. premium traffic of gold subscriber, or based on throughput commitments, e.g. whether or not this packet is needed to reach a certain level of throughput, or a combination of these, or any other, criteria.

The PNO does not need to know about the policies of the VNO, it just sees the first values of the incoming traffic and re-marks based on those and its own policy towards this VNO.

The following algorithm may be used.
1. The value range of the incoming traffic is split into N bins or buffers, which can be of equal size or follow logarithmic sizing or else. E.g. the first bin contains packets with the highest first values, whereas the last bin contains packets with the lowest first values. The more bins are used, the more precise the re-marking will be—but the more states the re-marker or the first communication node 10' needs to maintain or keep track on.
2. The re-marker or the first communication node 10' maintains a measure of traffic bandwidth $BW_i$ for each of the bins, namely how much traffic has recently arrived marked with a first value from that range, expressed e.g., in bits/second. The measurement may happen either slotted, e.g. the volume of traffic is measured for some time period and at the end of the period divide it by the length of the period and use this value in the next slot, or as a moving average or some other method.
3. When a packet arrives with a first value V or VNO value that falls into the ith bin, which ranges from $V_{i,lower}$ to $V_{i,upper}$, with $V_{i,lower} < V < V_{i,higher}$ the re-marker or the first communication node 10' also adds the bandwidth of the first i−1 bins together and adds a fraction of the bandwidth of the ith bin to it as below.

$$BW(V) = \sum_{j=1}^{i-1} BW_j + \frac{V - V_{i,lower}}{V_{i,higher} - V_{i,lower}} BW_i$$

Figure 3:
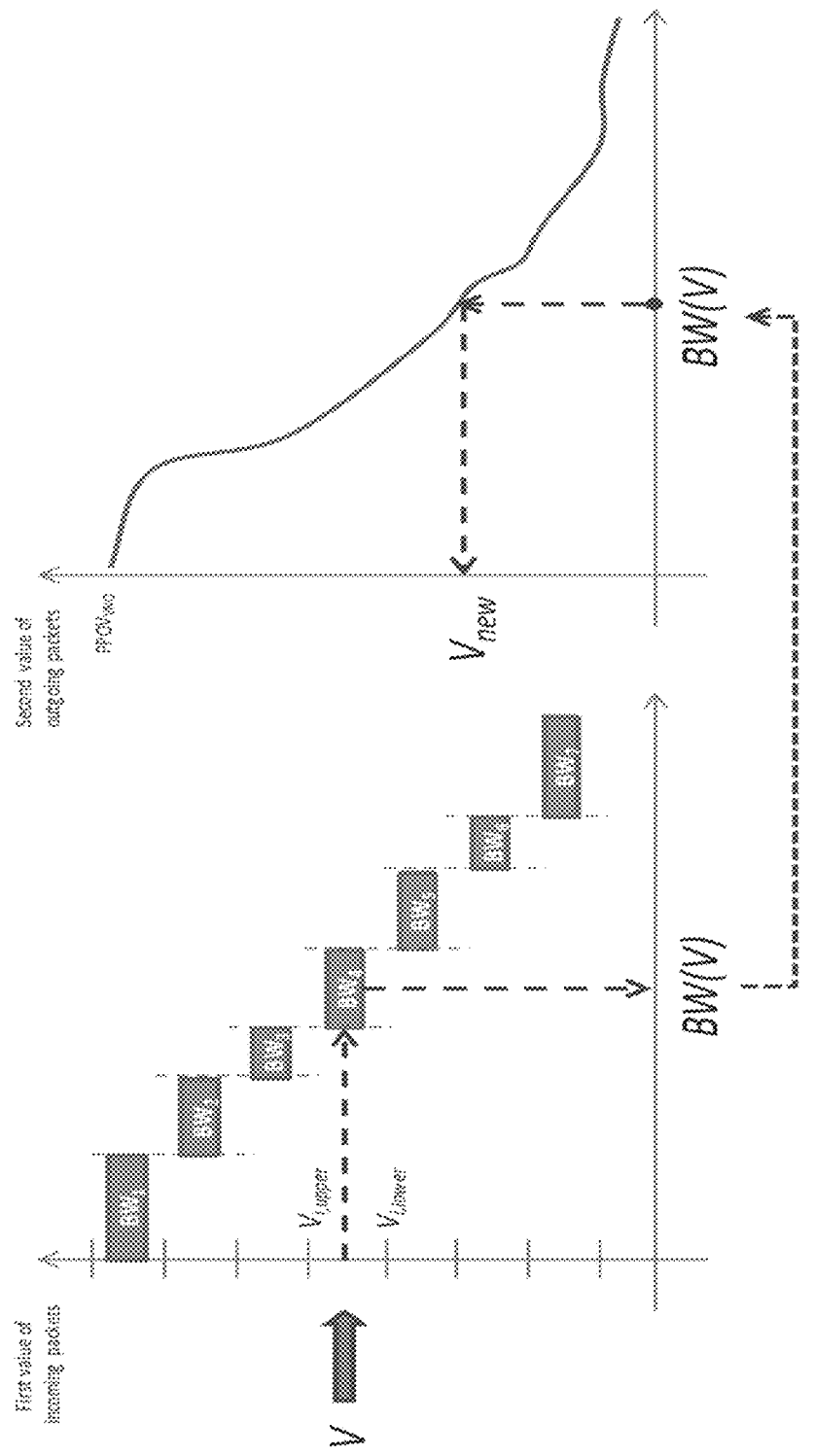
FIG. 3 shows graphs depicting a relationship between a first value and a second value.

(See FIG. 3.)
Note that many other variant is possible for the second term—even a random selection is applicable.

Then the re-marker substitutes the first value to the second value from the PPOV curve the PNO has assigned to this VNO, as below $$V_{new} = PPOV_{VNO}(BW(V))$$

The re-marker encapsulates the packet, if encapsulation is needed, and assigns the above second value to it. It should be noted that the curve may be related to another packet value or color or label as defined in e.g. "Rainbow fair queueing" (RFQ), wherein each flow is divided into a set of layers, based on rate. The packets in a flow are marked at an edge router with a layer label, or "color". A core router maintains a color threshold and drops layers whose color exceeds the threshold. Thus, it relates to a packet coloring and buffer management scheme that emulates a fair sharing but avoids packet classification and per-flow state operations in the core. The core routers still perform First In First Out (FIFO) scheduling scheme.

An advantage of embodiments herein is that it is provided a policy-based resource sharing for virtual networking, where both the PNO and the VNO may have policies on how to share resources between VNOs and clients, respectively. Note that as explained above, this includes a wide range of networking scenarios, such as mobile roaming.

Furthermore, an advantage of embodiments herein is that resource sharing for elastic/adaptive traffic may be controlled in a way to fully utilize statistical multiplexing gains.

Further, an advantage of embodiments herein is that resource sharing is provided in multiple levels of virtualization with each level having its own policy.

Yet another advantage of some embodiments herein is that since PPOV queuing is simple and possible to implement in fast hardware, embodiments herein scale to transport or data center speeds. Furthermore, since PPOV queuing does not keep any flow state the embodiments herein scale well to a very large number of VNOs, VVNOs and customer flows.

FIG. 3 illustrates the process of relating the first (VNO) value to the second value. The left side shows a first graph where bandwidth is defined along a horizontal axis and first values are defined along a vertical axis. The right side shows a second graph where bandwidth is defined along a horizontal axis and second values are defined along a vertical axis. From these graphs it is illustrated how the second value is obtained. The first values are divided into bins or groups and a bandwidth span of packets carrying the values of the bins/groups is measured and from a first value 'V' of an incoming packet a bandwidth BW(V) is calculated or retrieved from the first graph. Stripes correspond to the measured values of the bin. The bandwidth of arrived packets is measured, which arrived packets are marked with a value V, that is between V_i_upper and V_i_lower. So if the value space is from 1 to 100 and the values are divided into 10 bins, and e.g. the bandwidth of packets in the 1-10 value range (BW10) is measured just as bandwidth in the 11-20 (BW9) value range, etc. . . . . The sum of these measurements gives the total bandwidth of the arriving traffic. In the figure width between the stripes represent the actual measured value. E.g., BW7 is larger than BW6, so the striped space is wider. This then means that a higher volume/bandwidth of traffic arrived with very low values (7th bin) than in a slightly higher value bin (6th bin). They are depicted shifted to illustrate their summation. Shifting refers to the fact that the stripes or striped space are shown not from the origin of the horizontal axis, with the exception of a first striped space. Instead they are shifted leftward all the way to the right side of the previous striped space. This is done to facilitate the illustrating of the summation of the first X BW value. From the second graph which illustrates a PPOV curve of the second packet network, the PPOV curve being assigned to this VNO by the PNO, the second value is calculated or obtained based on the retrieved bandwidth of the first value and the PPOV curve. The PPOV curve is defined by a network operator. Essentially it is a tool to describe policy regarding the traffic it is applied to. A PPOV curve tells us how much traffic, e.g. what bandwidth, shall be marked with certain values. It is usually represented as Value as a function of BW (V(BW)) and it is defined as at most BW amount of traffic can have V(BW) marking of higher. It is supposedly a decreasing function. V(0) indicates then the highest value to be attached to any packet of the traffic. If the functions start out quite level from V(0), it is an indication that a lot of traffic (high BW) will be marked with values close to this highest value, for example. This means that the curve is slowly decreasing therefore the same or similar value is associated with a reasonably high bandwidth like with bandwidth 0.

Figure 4:
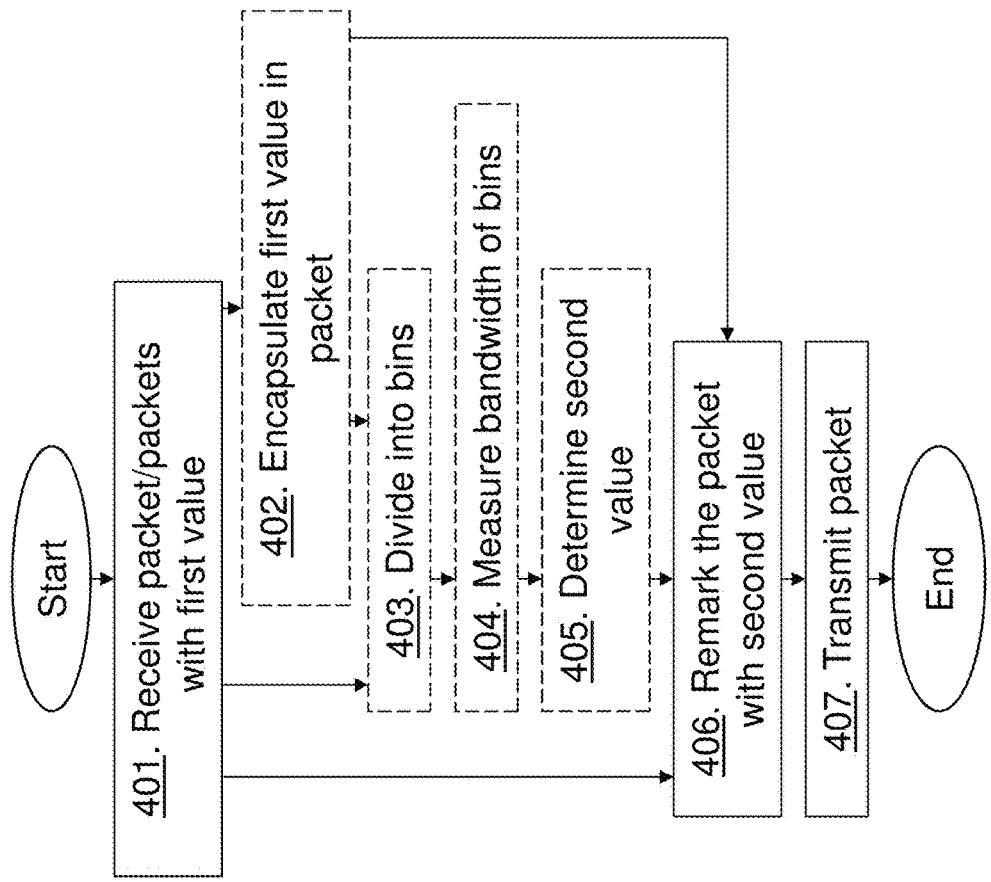
FIG. 4 is a flow chart depicting a method in a first communications node according to embodiments herein.

The method actions in the first communication node 10' for transmitting a packet in a first packet network operated by a first network operator towards a destination node 12 according to some embodiments will now be described with reference to a flowchart depicted in FIG. 4. The actions do not have to be taken in the order stated below, but may be taken in any suitable order. Actions performed in some embodiments are marked with dashed boxes. The first communication node 10' is comprised in the first packet network. The destination node 12 is comprised in the first packet network and/or the second packet network e.g. the second communication node 10".

Action 401. The first communication node 10' receives a packet with a first value related to resource sharing in a second packet network operated by a second network operator. The first value indicates a level of importance of the packet relative importance of another packet along a linear scale of the second packet network. In some embodiments the first communication node 10' receives a plurality of packets with a first value.

Action 402. The first communication node 10' may encapsulate the first value in the packet or a header of the packet.

Action 403. The first communication node 10' may further divide, when a plurality of packets has been received, value ranges of the first values of the received packets into bins/groups.

Action 404. The first communication node 10' may, when a plurality of packets has been received, measure bandwidth used by the received packets of the bins/groups.

Action 405. The first communication node 10' may, when a plurality of packets has been received, determine the second value based on the first value and the measured bandwidth of the bin/group of the first values. The second value may be determined based on a value curve related to the second packet network set by the first network operator.

Action 406. The first communication node 10' remarks or tags the packet with the second value related to resource sharing in the first packet network The second value indicates a level of importance of the packet relative importance of another packet along a linear scale of the first packet network. The second value may be related to the first value, and the second value may be similarly ordered relative other values along the scale of the second packet network as the first value is ordered relative other values along the scale of the first packet network.

Action 407. The first communication node 10' transmits, over the first packet network, the remarked packet towards the destination node 12.

The first packet network may be a physical network and the first network operator may be a PNO. The second packet network may then be a virtual network and the second network operator may be a VNO. Alternatively, the first packet network may be a visited network and the first network operator is a visited network operator, then the second packet network may be a home network and the second network operator may be a home network operator. Alternatively, the first packet network may be a first virtual network and the first network operator may be a first virtual network operator, then the second packet network may be a second virtual network and the second network operator may be a second virtual network operator.

Figure 5:
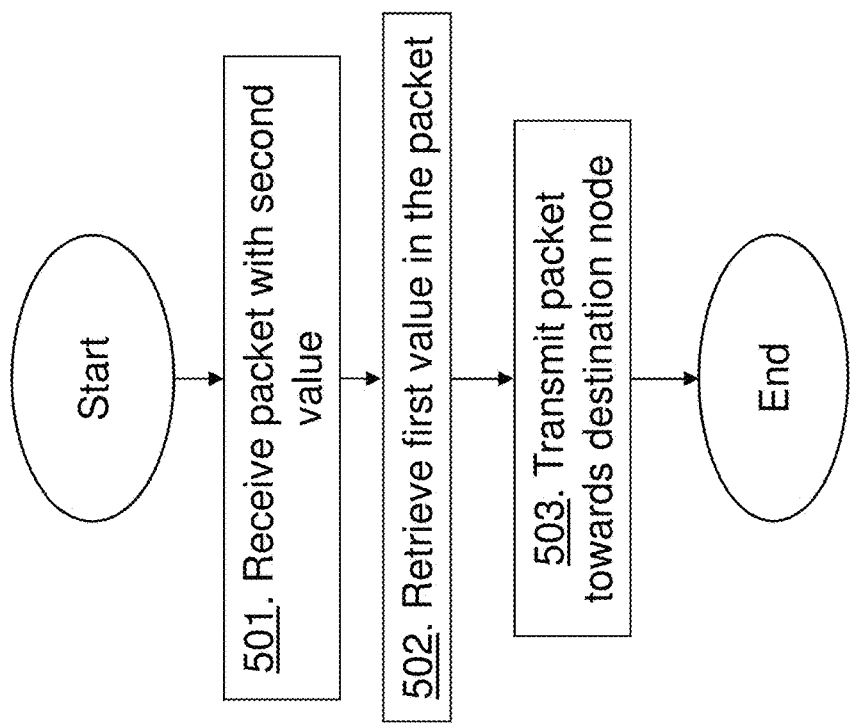
FIG. 5 is a flow chart depicting a method in a second communications node according to embodiments herein

The method actions in the second communication node 10" for transmitting, from the first packet network operated by the first network operator, a packet towards the destination node 12 in the second packet network operated by the second network operator according to some embodiments will now be described with reference to a flowchart depicted in FIG. 5. The actions do not have to be taken in the order stated below, but may be taken in any suitable order. Actions performed in some embodiments are marked with dashed boxes. The second communication node 10" is comprised in the first packet network.

Action 501. The second communication node 10" receives a packet with a second value related to resource sharing in the first packet network, wherein the second value indicates a level of importance of the packet relative importance of another packet along a linear scale of the first packet network.

Action 502. The second communication node 10" retrieves a first value in the received packet, which first value is related to resource sharing in the second packet network, and which first value indicates a level of importance of the packet relative importance of another packet along a linear scale of the second packet network. The second communication node 10" may retrieve the first value by decapsulating the packet to access the first value.

Action 503. The second communication node 10" transmits the packet with the first value towards the destination node 12 in the second packet network.

The first packet network may be a physical network and the first network operator may be a PNO. The second packet network may then be a virtual network and the second network operator may be a VNO. Alternatively, the first packet network may be a visited network and the first network operator is a visited network operator, then the second packet network may be a home network and the second network operator may be a home network operator. Alternatively, the first packet network may be a first virtual network and the first network operator may be a first virtual network operator, then the second packet network may be a second virtual network and the second network operator may be a second virtual network operator.

Figure 6:
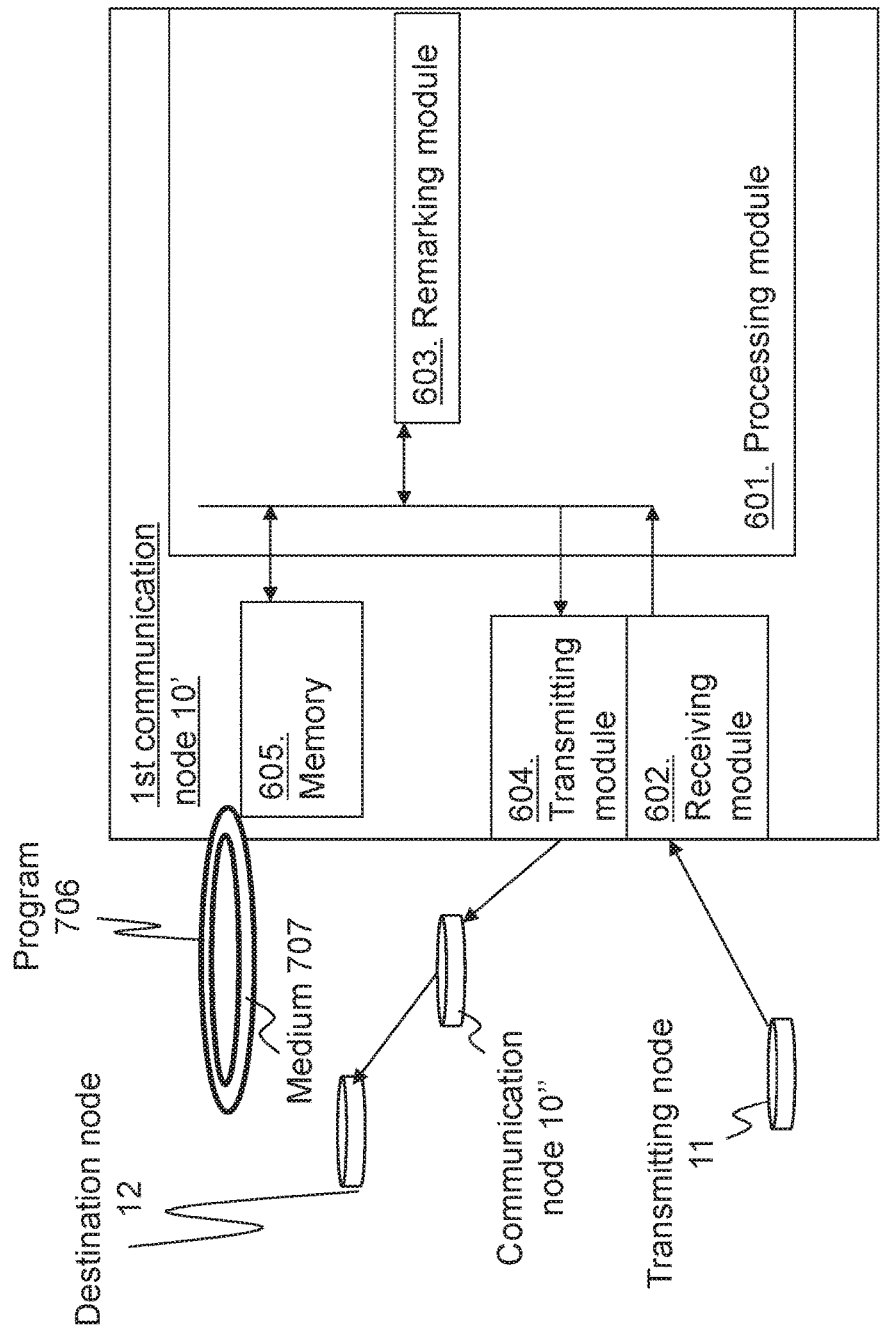
FIG. 6 is a block diagram depicting a first communications node according to embodiments herein.

FIG. 6 is a block diagram depicting the first communication node 10' for transmitting a packet in a first packet network operated by a first network operator towards a destination node. The first communication node is configured for the first packet network and the destination node 12 may be comprised in the first packet network and/or the second packet network. The embodiments herein for transmitting the packet in the first packet network may be implemented through a processing module 601 e.g. one or more processors, in the first communication node 10' depicted in FIG. 6, together with computer program code for performing the functions and/or method actions of the embodiments herein. The first communication node 10' may comprise a receiving module 602. The first communication node 10', the processing module 601 and/or the receiving module 602 may be configured to receive the packet with the first value related to resource sharing in the second packet network operated by a second network operator. The first value indicates a level of importance of the packet relative importance of another packet along a scale of the second packet network.

The first communication node 10' may comprise a remarking module 603. The first communication node 10', the processing module 601 and/or the remarking module 603 may be configured to remark the packet with a second value related to resource sharing in the first packet network, wherein the second value indicates a level of importance of the packet relative importance of another packet along a scale of the first packet network. The first communication node 10', the processing module 601 and/or the remarking module 603 may further be configured to encapsulate the first value in the packet or a header of the packet. The second value may be related to the first value and the second value is similarly ordered relative other values along the scale of the second packet network as the first value is ordered relative other values along the scale of the first packet network. The first communication node 10', the processing module 601 and/or the receiving module 602 may be configured to receive a plurality of packets with a first value and then the first communication node 10', the processing module 601 and/or the remarking module 603 may further be configured to divide value ranges of the first values of the received packets into bins/groups; and to measure bandwidth used by the received packets of the bins/groups, and also to determine the second value based on the first value and the measured bandwidth of the bin/group of the first values. The first communication node 10', the processing module 601 and/or the remarking module 603 may further be configured to determine the second value based on a value curve related to the second packet network set by the first network operator.

The first communication node 10' may comprise a transmitting module 604. The first communication node 10', the processing module 601 and/or the transmitting module 604 may be configured to transmit, over the first packet network, the remarked packet towards the destination node 10",12.

As stated above, the first packet network may be a physical network and the first network operator may be a physical network operator and the second packet network may be a virtual network and the second network operator may be a virtual network operator. Furthermore, the first packet network may be a visited network and the first network operator may be a visited network operator and the second packet network may be a home network and the second network operator may be a home network operator. The first packet network may be a first virtual network and the first network operator may be a first virtual network operator and the second packet network may be a second virtual network and the second network operator may be a second virtual network operator.

The first communication node 10' further comprises a memory 605. The memory 605 comprises one or more units that may be used to store data on, such as, first and second values, bandwidth, groups, curves, applications to perform the methods disclosed herein when being executed, and similar.

Figure 7:
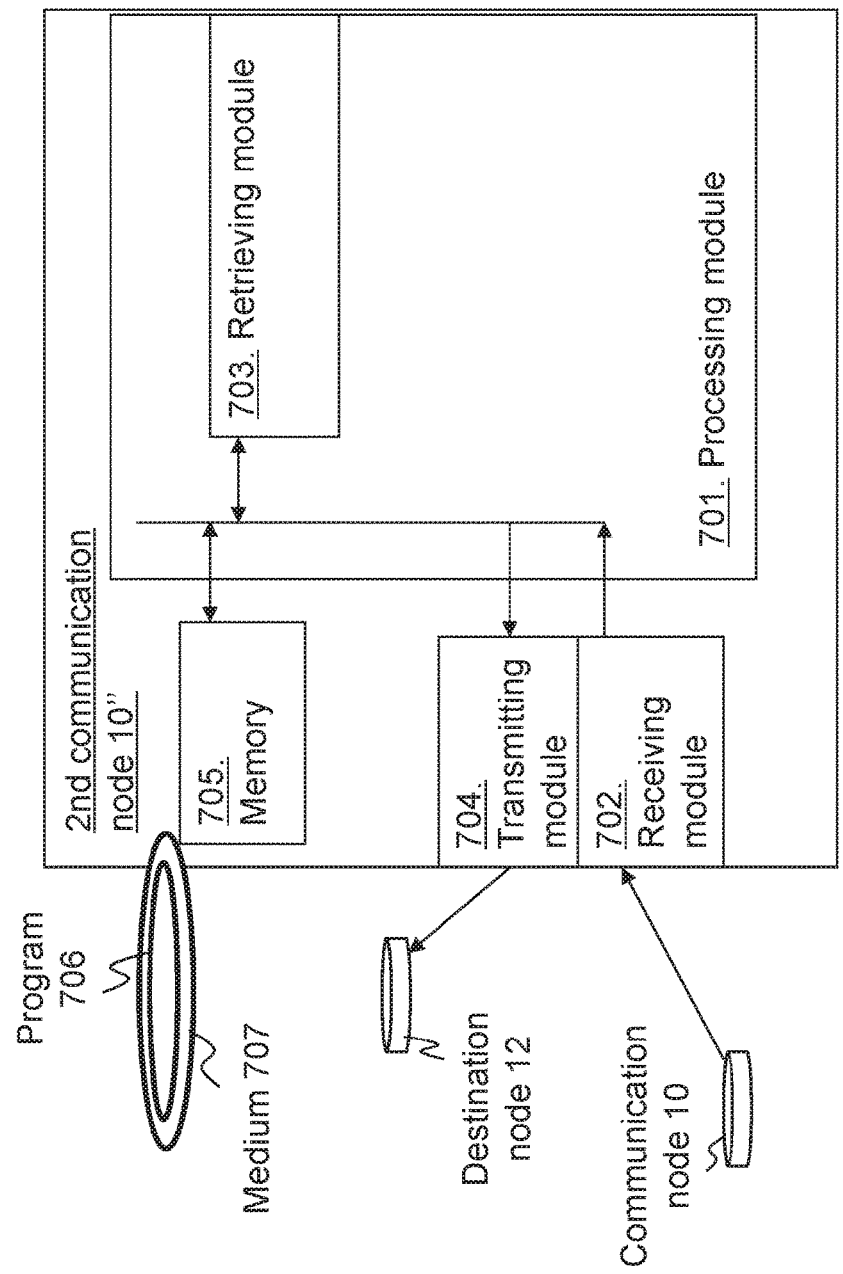
FIG. 7 is a block diagram depicting a second communications node according to embodiments herein

FIG. 7 is a block diagram depicting the second communication node 10" for transmitting, from a first packet network operated by a first network operator, a packet towards a destination node 12 in a second packet network operated by a second network operator. The second communication node 10" is configured for the first packet network. The embodiments herein for transmitting the packet in the first packet network may be implemented through a processing module 701 e.g. one or more processors, in the second communication node 10" depicted in FIG. 7, together with computer program code for performing the functions and/or method actions of the embodiments herein. The second communication node 10" may comprise a receiving module 702. The second communication node 10", the processing module 701 and/or the receiving module 702 may be configured to receive the packet with the second value related to resource sharing in the first packet network. The second value indicates a level of importance of the packet relative importance of another packet along a scale of the first packet network.

The second communication node 10" may comprise a retrieving module 703. The second communication node 10", the processing circuit 701 and/or the retrieving module 703 may be configured to retrieve a first value in the received packet, which first value is related to resource sharing in the second packet network. The first value indicates a level of importance of the packet relative importance of another packet along a scale of the second packet network. The second communication node 10", the processing circuit 701 and/or the retrieving module 703 may be configured to decapsulate the packet to access the first value.

The second communication node 10" may comprise a transmitting module 704. The second communication node 10", the processing circuit 701 and/or the transmitting module 704 may be configured to transmit the packet with the first value towards the destination node 12 in the second packet network.

As stated above, the first packet network may be a physical network and the first network operator may be a physical network operator and the second packet network may be a virtual network and the second network operator may be a virtual network operator. Furthermore, the first packet network may be a visited network and the first network operator may be a visited network operator and the second packet network may be a home network and the second network operator may be a home network operator. The first packet network may be a first virtual network and the first network operator may be a first virtual network operator and the second packet network may be a second virtual network and the second network operator may be a second virtual network operator.

The second communication node 10" further comprises a memory 705. The memory 705 may comprise one or more units to be used to store data on, such as, first and second values, bandwidth, groups, curves, applications to perform the methods disclosed herein when being executed, and similar.

Using values or packet values as described herein allow both differentiating packets and controlling resource sharing within bearers and among bearers over different packet networks with a single mechanism. That is, it is easy and natural to up-prioritize a sub-flow of a bearer or the first few packets of a flow. Differentiation is equally simple for best-effort and special traffic, even within a single bearer. In addition, other cases, such as giving priority to the first layer of videos for all users over their other traffic are also easy to realize.

E.g. PPOV supports a wide range of resource sharing policies, but fits QoE related policies especially well, when we focus on the value of each traffic piece to the destination node. Even handling for single packets may be defined, e.g. up-prioritize TCP start-up or ping. Since the resource sharing is defined by the packet marking, avoiding any impact or reconfiguration in the RAN, this can be especially easy to set up or reconfigure. In this way, the solution is extremely scalable and flexible in terms of setting up lots of different policies for the operator. Even on-the-fly reconfiguration of marking policies is possible, based on traffic measurements or analytics.

One option to define the packet values is to base it on the throughput of a given flow. The resource sharing can be described by the throughput-value curve. This allows an easy to understand visual representation of the resource sharing for a wide range of congestion levels. In addition, the slope of the curves determines the trade-off between throughput fairness and bandwidth utilization of the resource sharing in case of varying radio channel conditions. By choosing the intended value curve, the fairness-utilization trade-off may be influenced on a per service basis, and also dependent on the experienced service quality.

In addition to resource sharing over the air interface, the framework may be used to share many type of scarce resource. Possible examples are: buffer memory, packet processing resources.

The methods according to the embodiments described herein for the communication nodes are respectively implemented by means of e.g. a computer program 706 or a computer program product, comprising instructions, i.e., software code portions, which, when executed on at least one processor, cause the at least one processor to carry out the actions described herein, as performed by the communication nodes. The computer program 706 may be stored on a computer-readable storage medium 707, e.g. a disc or similar. The computer-readable storage medium 707, having stored thereon the computer program, may comprise the instructions which, when executed on at least one processor, cause the at least one processor to carry out the actions described herein, as performed by the communication nodes. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a first communication node for transmitting a packet in a first packet network operated by a first network operator towards a destination node, wherein the first communication node is part of the first packet network, the method comprising:

receiving the packet at the first communication node, the packet as received being already marked with a first value related to resource sharing in a second packet network operated by a second network operator, wherein the first value indicates a level of importance of the packet, relative to importance of other packets, along a scale of the second packet network;

remarking the packet with a second value related to resource sharing in the first packet network, wherein the second value indicates a level of importance of the packet, relative to importance of other packets, along a scale of the first packet network; and transmitting, over the first packet network, the remarked packet towards the destination node.

2. The method of claim 1, further comprising encapsulating the first value in the packet or a header of the packet.

3. The method of claim 1, wherein the destination node is part of the second packet network.

4. The method of claim 1, wherein the second value is related to the first value, and the second value is similarly ordered relative to other values along the scale of the second packet network as the first value is ordered relative to other values along the scale of the first packet network.

5. The method of claim 1, wherein said receiving comprises receiving a plurality of packets with a first value, and wherein the method further comprises dividing value ranges of the first values of the received packets into groups;

measuring bandwidth used by the received packets of the groups; and determining the second value based on the first value and the measured bandwidth of the group of the first values.

6. The method of claim 1, wherein said determining the second value is further based on a value curve related to the second packet network set by the first network operator.

7. The method of claim 1, wherein the first packet network is a physical network and the first network operator is a physical network operator and the second packet network is a virtual network and the second network operator is a virtual network operator; wherein the first packet network is a visited network and the first network operator is a visited network operator and the second packet network is a home network and the second network operator is a home network operator; wherein the first packet network is a first virtual network and the first network operator is a first virtual network operator and the second packet network is a second virtual network and the second network operator is a second virtual network operator.

8. A method in a second communication node for transmitting, from a first packet network operated by a first network operator, a packet towards a destination node in a second packet network operated by a second network operator, wherein the second communication node is part of the first packet network, the method comprising:

receiving the packet, at the second communication node, the packet as received being already marked with a second value related to resource sharing in the first packet network, wherein the second value indicates a level of importance of the packet, relative to importance of other packets, along a scale of the first packet network;

retrieving a first value in the received packet, which first value is related to resource sharing in the second packet network, and which first value indicates a level of importance of the packet, relative to importance of other packets, along a scale of the second packet network; and transmitting the packet with the first value towards the destination node in the second packet network.

9. The method of claim 8, wherein said retrieving is performed by decapsulating the packet to access the first value.

10. The method of claim 8, wherein the first packet network is a physical network and the first network operator is a physical network operator and the second packet network is a virtual network and the second network operator is a virtual network operator; wherein the first packet network is a visited network and the first network operator is a visited network operator and the second packet network is a home network and the second network operator is a home network operator; wherein the first packet network is a first virtual network and the first network operator is a first virtual network operator and the second packet network is a second virtual network and the second network operator is a second virtual network operator.

11. A first communication node for transmitting a packet in a first packet network operated by a first network operator towards a destination node, wherein the first communication node is configured for use in the first packet network and comprises:
 a receiver configured to receive a packet, the packet as received being already marked with a first value related to resource sharing in a second packet network operated by a second network operator, wherein the first value indicates a level of importance of the packet, relative to importance of other packets, along a scale of the second packet network;
 a processing circuit configured to remark the packet with a second value related to resource sharing in the first packet network, wherein the second value indicates a level of importance of the packet, relative to importance of other packets, along a scale of the first packet network; and
 a transmitter configured to transmit, over the first packet network, the remarked packet towards the destination node.

12. The first communication node of claim 11, wherein the processing circuit is further configured to encapsulate the first value in the packet or a header of the packet.

13. The first communication node of claim 11, wherein the destination node is comprised in the second packet network.

14. The first communication node of claim 11, wherein the second value is related to the first value, and the second value is similarly ordered relative to other values along the scale of the second packet network as the first value is ordered relative to other values along the scale of the first packet network.

15. The first communication node of claim 11, wherein the processing circuit is configured to receive a plurality of packets with a first value, and is further configured to divide value ranges of the first values of the received packets into groups; to measure bandwidth used by the received packets of the groups, and to determine the second value based on the first value and the measured bandwidth of the group of the first values.

16. The first communication node of claim 11, wherein the processing circuit is further configured to determine the second value based on a value curve related to the second packet network set by the first network operator.

17. The first communication node of claim 11, wherein the first packet network is a physical network and the first network operator is a physical network operator and the second packet network is a virtual network and the second network operator is a virtual network operator; wherein the first packet network is a visited network and the first network operator is a visited network operator and the second packet network is a home network and the second network operator is a home network operator; wherein the first packet network is a first virtual network and the first network operator is a first virtual network operator and the second packet network is a second virtual network and the second network operator is a second virtual network operator.

18. A second communication node for transmitting, from a first packet network operated by a first network operator, a packet towards a destination node in a second packet network operated by a second network operator, wherein the second communication node is configured for use in the first packet network and comprises:
 a receiver configured to receive the packet, the packet as received being already marked with a second value related to resource sharing in the first packet network, wherein the second value indicates a level of importance of the packet, relative to importance of other packets, along a scale of the first packet network;
 a processing circuit configured to retrieve a first value in the received packet, which first value is related to resource sharing in the second packet network, and which first value indicates a level of importance of the packet, relative to importance of other packets, along a scale of the second packet network; and
 a transmitter configured to transmit the packet with the first value towards the destination node in the second packet network.

19. The second communication node of claim 18, wherein the processing circuit is configured to decapsulate the packet to access the first value.

20. The second communication node of claim 18, wherein the first packet network is a physical network and the first network operator is a physical network operator and the second packet network is a virtual network and the second network operator is a virtual network operator; wherein the first packet network is a visited network and the first network operator is a visited network operator and the second packet network is a home network and the second network operator is a home network operator; wherein the first packet network is a first virtual network and the first network operator is a first virtual network operator and the second packet network is a second virtual network and the second network operator is a second virtual network operator.

21. A non-transitory computer-readable storage medium comprising, stored thereupon, a computer program comprising instructions that, when executed on at least one processor of a first communication node in a first packet network operated by a first network operator, cause the at least one processor to cause the first communication node to:
 receive a packet, the packet as received being already marked with a first value related to resource sharing in a second packet network operated by a second network operator, wherein the first value indicates a level of importance of the packet, relative to importance of other packets, along a scale of a second packet network;
 remark the packet with a second value related to resource sharing in the first packet network, wherein the second value indicates a level of importance of the packet, relative to importance of other packets, along a scale of the first packet network; and
 transmit, over the first packet network, the remarked packet towards a destination node.

22. A non-transitory computer-readable storage medium comprising, stored thereupon, a computer program comprising instructions that, when executed on at least one processor of a second communication node in a first packet network operated by a first network operator cause the second communication node to:
- receive a packet, the packet as received being already marked with a second value related to resource sharing in the first packet network, wherein the second value indicates a level of importance of the packet, relative to importance of other packets, along a scale of the first packet network;
- retrieve a first value in the received packet, which first value is related to resource sharing in a second packet network operated by a second network operator, and which first value indicates a level of importance of the packet, relative to importance of other packets, along a scale of the second packet network; and
- transmitting the packet with the first value towards the destination node in the second packet network.

* * * * *